United States Patent [19]

Fougea

[11] 4,309,366

[45] Jan. 5, 1982

[54] INDUCED DRAFT COOLING TOWER WITH IMPROVED INNER SUPPORT STRUCTURE

[75] Inventor: Bernard Fougea, Neuilly-sur-Seine, France

[73] Assignee: Coignet S.A., Paris, France

[21] Appl. No.: 161,355

[22] Filed: Jun. 20, 1981

[30] Foreign Application Priority Data

Jun. 20, 1979 [FR] France ................................ 79 15764

[51] Int. Cl.³ ............................................. B01F 3/04
[52] U.S. Cl. ...................................... 261/109; 52/245; 261/DIG. 11
[58] Field of Search ............... 261/109, 111, DIG. 11, 261/DIG. 77; 165/DIG. 1; 52/245, 403, 637, 638

[56] References Cited

U.S. PATENT DOCUMENTS

| | | |
|---|---|---|
| 3,243,166 | 3/1966 | Osenga et al. ............. 261/DIG. 11 |
| 3,743,257 | 7/1973 | Fordyce ...................... 261/DIG. 11 |
| 3,761,067 | 9/1973 | Marosi et al. .............. 261/DIG. 11 |
| 3,801,076 | 4/1974 | Furlong et al. ...................... 261/111 |
| 4,048,265 | 9/1977 | Fordyce et al. ..................... 261/111 |

FOREIGN PATENT DOCUMENTS

| | | |
|---|---|---|
| 346871 | 6/1920 | Fed. Rep. of Germany ... 261/DIG. 11 |
| 2236155 | 1/1975 | France . |
| 450022 | 7/1936 | United Kingdom ....... 261/DIG. 11 |
| 582727 | 11/1946 | United Kingdom ....... 261/DIG. 11 |

*Primary Examiner*—Richard L. Chiesa
*Attorney, Agent, or Firm*—Diller, Ramik & Wight

[57] ABSTRACT

An induced draft cooling tower having an annular outer support structure for the dispersion section and the inner support structure for the ventilation section. The inner support structure is essentially constructed of precast reinforced concrete elements and comprises a first plurality of columns supporting a circumferential beam, a second plurality of columns arranged around a hexagonal central tower in a hexagonal network with beams extending between and supported in slotted capitals of the second plurality of beams. The diffusers which are precast reinforced concrete shells include a toroidal base element which bears on three beams supported on a column of the second plurality coaxial to the diffuser. Stacks of annular elements rise from the upper edges of the base elements. The lower edges of the base elements are polygonal and substantially meet the lower edges of adjacent base elements. Slabs cover openings between lower edge segments of base elements and in the peripheral area beyond the diffusers. The resulting inner support structure is in effect monolithic.

13 Claims, 8 Drawing Figures

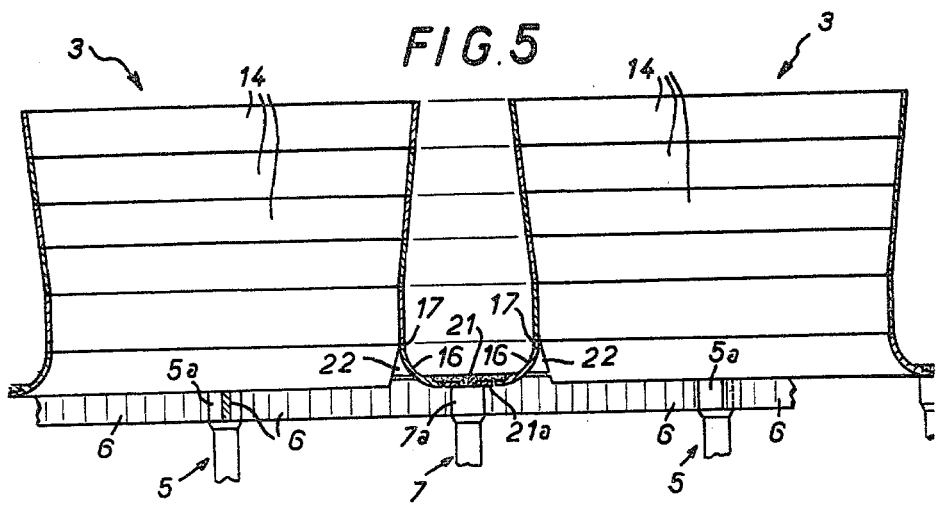
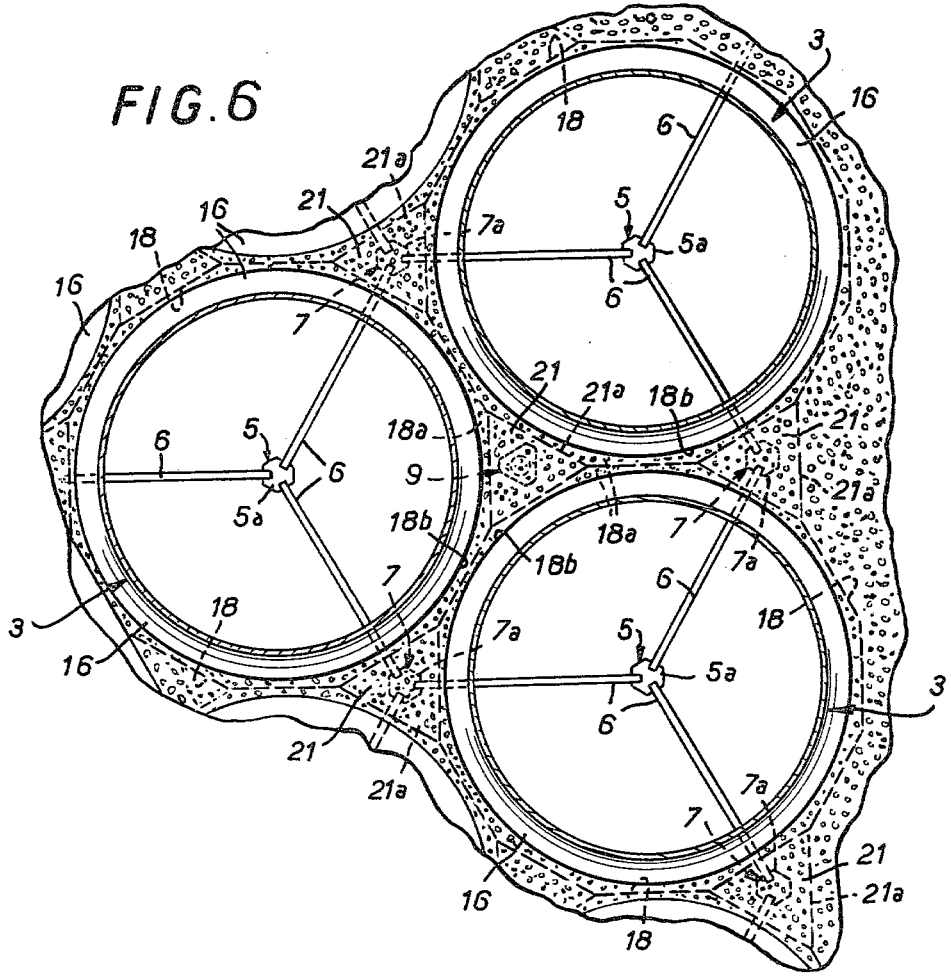

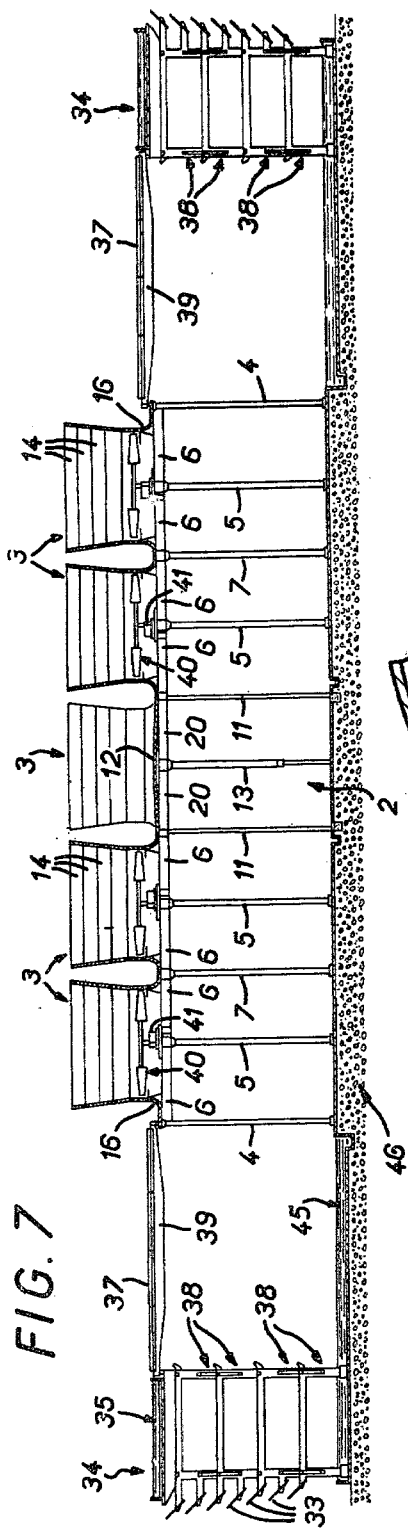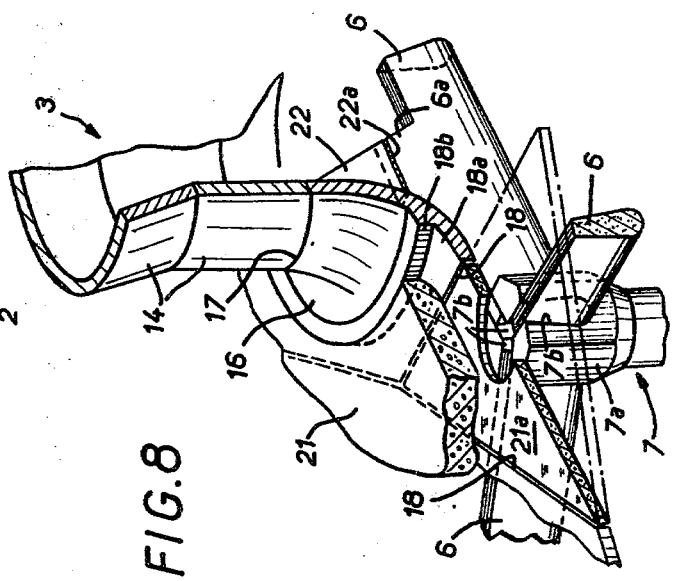

INDUCED DRAFT COOLING TOWER WITH IMPROVED INNER SUPPORT STRUCTURE

The present invention relates to improvements in induced draft cooling towers, and more particularly to the inner support structure for the ventilation section of such cooling towers.

Such cooling towers are used for cooling the hot water from the condenser circuits of power plants. Present day cooling towers comprise a so-called dispersion section including a raised, hot water supply basin to which hot water from the condenser circuits of the power plant is delivered. The water is allowed to drop or is sprayed from the basin into the actual dispersion section which is provided with fills or baffles which in association with air entering through the outer periphery of the cooling tower causes some of the water to evaporate thereby reducing the temperature of the rest of the water. The moist air is then drawn inwardly to the ventilation section by a plurality of diffusers provided with blowers which exhaust the moist air upwards to the atmosphere. The rest of the water is collected in the lower, cool water basin at a temperature about 10° C. less than that of the water in the upper hot water supply basin.

The capacity of such cooling towers has grown over the years to keep pace with the increase in size of power plants which today commonly produce 900 megawatts or more. For such power plants the cooling towers must be capable of dissipating of the order of 3000 megawatts in cooling the hot condenser water. This calls for cooling towers of ever-increasing size.

But it is no longer possible to merely increase the size of conventional cooling tower structures which may have to exceed 170 meters in diameter and 30 meters in height without developing problems of stability of the supporting structure because of the fact that the maximum acceptable loads on the foundations have already been reached and the inevitable deformations of the components of such large scale structures are greater than those acceptable in conventional constructions. Furthermore these structures must be designed to withstand forces and shocks due to earthquakes.

Large dimension cooling towers are known such as those disclosed in French printed patent application No. 2,236,155 in which there is in effect no inner support structure for the ventilation section. Indeed the blowers and diffusers are simply mounted on an annular platform which is supported by partitions on the outer support structure which therefore supports both the dispersion section and the ventilation section of the cooling tower.

Smaller cooling tower structures are taught in U.K. Pat. Nos. 450,022 and 582,727 but neither provide solutions for stabilized vertical support structure for cooling towers of very large dimensions.

An object of the invention is therefore to provide a support structure for supporting the ventilation section of a cooling tower which provides solutions to the above problems.

Another object of the invention is to provide an inner support structure for the ventilation section of a cooling tower essentially constructed of precast reinforced concrete elements with a minimum of in situ reinforced concrete joints of small dimensions.

A further object of the invention is to provide such an inner support structure having a very dense grouping of diffusers per unit area of the ventilation section by reducing the inter-axis spacing of the diffusers to a minimum.

According to yet another object of the invention there is provided an inner support structure for supporting the ventilation section of a cooling tower which is comprised of a relatively small number of standardized precast reinforced concrete components.

According to the invention there is provided an induced draft cooling tower of the type comprising an annular outer support structure for supporting a dispersion section including a hot water supply basin and an inner support structure for supporting a ventilation section essentially constructed of precast reinforced concrete elements supporting a plurality of regularly spaced diffusers, each of the diffusers being adapted to accommodate blower and drive means at its base, the inner support structure comprising a regular hexagonal central tower and a circumferential beam concentric to the central tower defining the perimeter of said inner support structure, a first plurality of circumferential columns supporting the circumferential beam, a regular hexagonal structural network including a second plurality of columns disposed at apices of the hexagonal structural network, beams extending between and supported by the second plurality of columns, the diffusers bearing on the beams of the hexagonal structural network and thus supported by the second plurality of columns.

Preferably, the diffusers are disposed coaxially of selected alternating columns of the second plurality of columns of the hexagonal structural network, each of the plurality of diffusers is borne by three beams of the hexagonal network and is supported by six columns in all, three of the last mentioned six columns being the nonselected columns of the second plurality of columns and the three other columns alternating with the nonselected columns being part of a third plurality of columns of an equilateral triangular network.

According to a preferred embodiment the diffusers comprise a concave toroidal base element having an upper circular edge and a lower lip with a polygonal edge, the polygonal edges of the lower lips of the diffusers substantially meeting with corresponding polygonal edges of other adjacent diffusers.

According to the preferred embodiment the toroidal base of each diffuser has three radially extending projections having bearing surfaces bearing on the three beams supporting the associated diffuser.

Preferably, nonselected columns of the second plurality of columns and the columns of the third plurality are arranged directly beneath openings defined by segments of the peripheral edges of three adjacent diffusers, a similarly shaped polygonal precast concrete slab is positioned in the openings and concrete is then poured in situ to form a junction between the three adjacent diffusers and the associated columns therebeneath.

Preferably, the central tower comprises six apical columns and a central column coinciding with the axis of the cooling tower, six beams extending from the central column to the apical columns of the central tower and bearing a slab floor.

As will be understood the resulting inner support structure for the ventilation section may be constructed of by assembling standardized precast reinforced structural components including the beams, the toroidal bases and annular elements of the diffusers, the various columns and the sections of the circumferential beam. Furthermore a minimum of in situ joints are necessary, notably the junction at the intersection of the lips of adjacent diffusers. The resulting inner support structure is in effect an overall monolithic structure without the constraints and drawbacks of such constructions and with greater precision and security. Moreover the resulting structure is capable of safely withstanding the horizontal forces and shocks due to earthquakes.

These and other features and advantages of the invention will be brought out in the description which follows, given by way of nonlimiting example of an embodiment of the invention, with reference to the accompanying drawings, in which:

FIG. 5 is an enlarged sectional view through two adjacent diffusers taken on line V—V in FIG. 1;

FIG. 6 is an enlarged plan view of three adjacent diffusers taken at the level of the upper edges of their toroidal base elements;

FIG. 7 is a schematic general elevational view in section of the entire cooling tower illustrating the overall layout; and FIG. 8 is a fragmentary perspective view of a diffuser supported by a beam on a column.

Figure 1:
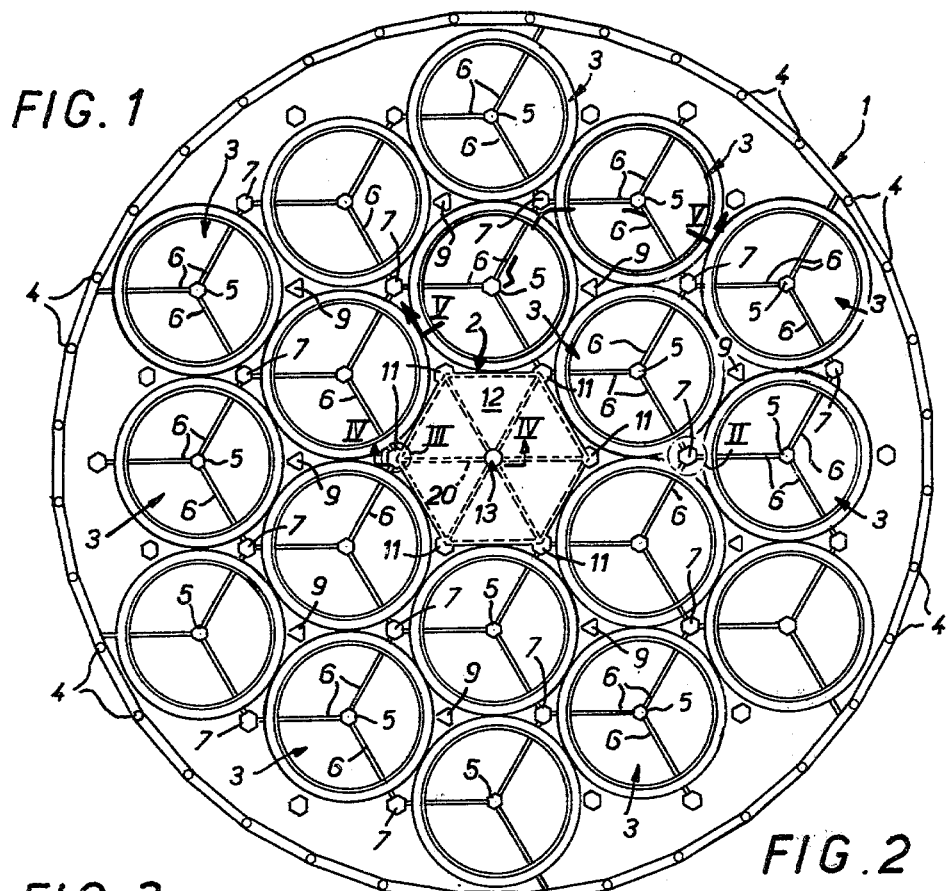
FIG. 1 is a schematic general plan view of the ventilation section with its support structure of a cooling tower embodying the present invention.
Figure 3:
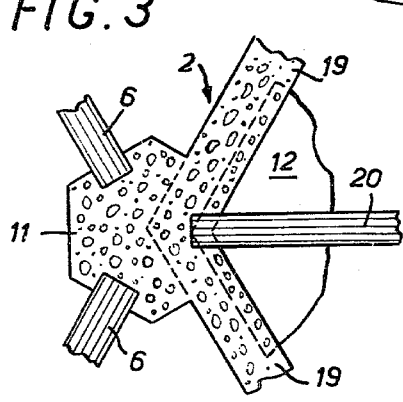
FIG. 3 is an enlarged bottom view of the junction between the slab floor of the central tower and one of its apical columns encircled by a chain-dotted line III in FIG. 1.

Reference will first be had to FIG. 7 which shows a general elevational view of an induced draft cooling tower embodying an inner support structure for supporting the ventilation section embodying the invention. Before describing in detail the construction of the inner support structure the rest of the cooling tower will be briefly described.

At the outer periphery of the cooling tower is provided an annular outer support structure for supporting the ventilation section including the upper hot water supply basin 35. The annular outer support comprises a plurality of annularly spaced independent towers 34 defined by superposed portal frames 38 stacked on one another, with cantilevers carrying inclined louvers 33 and wind braces (not shown) connected between the portal frames. Each tower is thus self-supporting and self-stabilized.

To give a reader a better idea of the relative sizes of the ventilation and dispersion sections it should be pointed out that the outer diameter of the outer support structure may be about 170 meters and the diameter of the inner support structure about 75 meters and the height of the cooling tower to the top of the diffusers about 30 meters.

An annular roof 37 is hung between the outer support structure just described and the inner support structure for supporting the ventilation section according to the invention. The roof frame comprises radial beams 39 and cross beams (not shown).

The details of this outer support structure are disclosed in detail in copending application No. 161,356 filed June 20, 1980 which relates specifically to this aspect of the cooling tower, incorporated by reference.

The ventilation section comprises a plurality of diffusers or cells 3 with blower means 40 and drive means 41 accommodated at the bases of the diffusers 3. The actual inner support structure comprises a central regular hexagonal tower 2, a second plurality of long columns 5 and 7 arranged in a regular hexagonal ntwork (see FIG. 1) with a third plurality of long columns 9 arranged in an equilateral triangular network at the centers of the hexagonal elements of the first network. The details of the inner support structure will be given hereinbelow.

As for the operation of such a cooling tower suffice it to say hot water from the condensers of a nearby power plant is delivered to the open hot water supply basin 34. The hot water drops through apertures or is sprayed by nozzles in the floor of the basin and trickles through the dispersion section per se where baffles or fills slow the fall and assist evaporation by the air entering through the louvered periphery of the outer support structure. The moist air is then drawn by the blower means 40 toward the ventilation section and upwards and out of the diffusers 35 into the atmosphere. The rest of the thus-cooled water eventually falls to the lower collector basin 45 where it is recovered, the temperature of the cooled water in the lower basin being, say, at 23° C. when the hot water in the upper basin 35 is at about 32-35° C.

Figure 4:
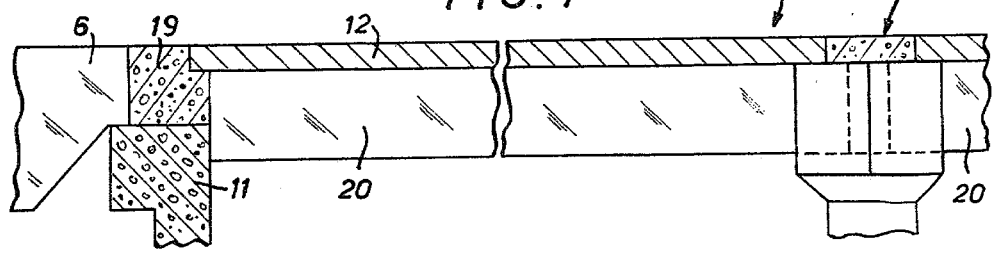
FIG. 4 is an enlarged sectional view of the slab floor of the central tower taken on line IV—IV in FIG. 1.

As mentioned above and as best seen in FIG. 1, at the center of the inner support structure is the hexagonal central tower 2 comprising a plurality of six apical long columns 11 of precast reinforced concrete construction and a central column 13 at the center of the entire inner support structure. Six identical beams 20 of precast reinforced concrete construction in a star array extend between each one of the apical columns 11 and central column 13 and the ends of the beams 20 are received in vertical slots formed in the corresponding capitals of the columns 11 and 13 (see FIG. 4). A hexagonal slab floor 12 of precast reinforced concrete is supported on the beams 20 and the capital of the central column 13 and by means of a peripheral hexagonal web 19 on the capitals of the apical columns 11. Preferably as shown in FIG. 4 a concrete joint may be formed above the capital of column 13 between the beams and the slab floor 12.

The hexagonal central tower 2 thus constructed is very rigid in torsion and bending and is intended to transmit to the foundation 46 the forces radiating in all directions.

As previously mentioned the outer perimeter of the inner support structure is defined by a circumferential beam 1 supported by a first plurality of equidistant circumferential long columns 4 of precast reinforced concrete construction arranged in a circle, some of the columns 4 having capitals adapted to receive beams extending inwardly from the circumferential beam.

Between the central tower 2 and the circumferential beam 1 is the second plurality of long columns 5 and 7 also of precast reinforced concrete construction which alternate with each other at the apices of the hexagonal network starting at the apical columns 11 of the central tower 2. This hexagonal network is arranged so that the three innermost hexagonal elements each overlap one-third of the area of the hexagonal central tower 2 as seen in FIG. 1.

The columns 5 and 7 are interconnected by a plurality of beams or girders 6 which define the sides of the hexagonal elements of the network and are of precast reinforced concrete construction. The beams 6 may have a section of maximum inertia approximately at the position at which the load of the diffuser 3 bears in which case the lower side of the beam 6 tapers to its respective ends from this section. The columns 5 define the centers of diffusers or cells 3 and support one end of three radiating beams 6 which in turn support the actual diffusers 3 (see FIGS. 5 and 6). The columns 7 in turn bear the other ends of the beams 6 as best shown in FIG. 8 and described in greater detail hereinbelow.

Columns 7 are thus arranged around the periphery of their associated diffusers 3 and alternate with the third plurality of long columns 9. The columns 7 and 9 are therefore arranged at the intersection of three adjacent diffusers.

The diffusers 3 (18 in the illustrated embodiment) comprise a concave toroidal base element 16 (FIGS. 5 and 8) having a circular upper edge 17, a lower polygonal edge 18 (here a dodecahedron) and a curved lower peripheral lip 18a running along the outer surface of the base element up to a shoulder 18b.

The diffusers 3 further comprise a series of five superposed annular elements 14 of precast reinforced concrete construction, each of a shape corresponding to that of a zone of the generally hyperboloid diffusers 3. To ensure fluidtightness of the diffusers mortar bonding material is applied to the circular edges of the annular elements 14 and the upper circular edge 17 of the base element 16 before they are assembled. These edges may have locating lugs (not shown) to ensure that the annular elements 14 are in a precise relative angular position. The total height of the diffusers may be about 10 meters and the diameter about 15 meters.

The base elements 16 of the diffusers 3 have three inwardly extending generally triangular shaped bearing projections 22 with a horizontal bearing surface 22a which is adpated to bear against a corresponding horizontal bearing surface 6a on each of the three beams 6 carrying the associated diffuser 3.

Figure 2:
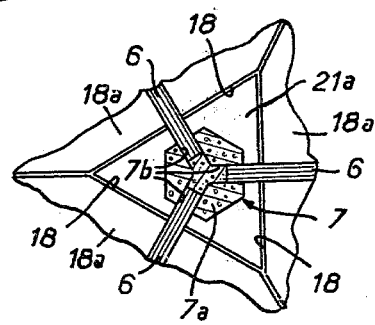
FIG. 2 is an enlarged bottom view of a junction of three beams and the lips of three diffusers encircled by chain-dotted line II in FIG. 1.

When the diffusers 3 are in position on beams 6 supported in the slotted capitals 5a and 7a of the columns 5 and 7, triangular openings are defined above each column 7 by three edge segments of the polygonal peripheral edges 18 of three adjacent diffuser base elements 16. To close off the opening between these three adjacent diffusers 3 (see FIGS. 2 and 8) a precast concrete slab 21 of the same triangular configuration as the triangular opening is positioned into the opening and bears on the top edges of the three beams 6. The triangular slab 21 has a central hole thereby exposing the top of the capital 7a including the ends of the beams 6 in its slots 7b as best seen in FIG. 8.

A similar triangular precast concrete slab 21a may be positioned in the triangular opening between three adjacent diffusers above a column 9 (see FIG. 6). The hole in the center of the triangular slab 21a is designed small enough so that the slab 21a may bear directly on the corresponding capital of the column 9. Once these triangular slabs 21a are in position around one or more diffusers 3 concrete may be poured in situ over the triangular slabs 21 and between the peripheral edges 18 of adjacent diffusers and over their lower peripheral lips 18a and up to their shoulders 18b to provide continuity around and between all the diffusers 3 (see FIG. 6).

As shown in FIG. 8, to complete the diffusers, blower means 40 comprising suitable bladed members are arranged coaxially of the columns 5 at the center of the diffusers 3 and supported by the beams 6 and capital of column 5 and are driven by suitable drive means 41 including a motor and speed reducing gear.

Between the outermost columns 7 and 9 and the circumferential beam 1 additional beams may be run (not shown) and other concrete slabs may be laid between the outermost diffusers and the circumferential beam and supported in fact by the outermost columns 7 and 9 to provide continuity along the peripheral area of the inner support structure.

The resulting inner support structure is thus in effect monolothic but of superior mechanical strength and precision owing to the fabrication of each of the components a precast reinforced concrete elements and a minimum of in situ joints.

The cooling tower inner support structure is not intended to be limited to the above described embodiment but may encompass various modifications and alternatives without departing from the spirit and scope of the invention as defined by the appended claims.

What is claimed is:

1. An induced draft cooling tower of the type having an annular outer support structure for supporting a dispersion section including a hot water supply basin and an inner support structure for supporting a ventilation section essentially constructed of precast reinforced concrete elements supporting a plurality of regularly spaced diffusers, each of the diffusers being adapted to accommodate blower and drive means at its base, said inner support structure comprising a regular hexagonal cenral tower and a circumferential beam concentric to the said central tower defining the perimeter of said inner support structure, a first plurality of circumferential columns supporting said circumferential beam, a regular hexagonal structural network including a second plurality of columns disposed at apices of said hexagonal structural network, beams extending between and supported by said second plurality of columns, said diffusers bearing on said beams of said hexagonal structural network and thus supported by said first plurality of columns.

2. A cooling tower according to claim 1, wherein said diffusers are disposed coaxially of selected alternating columns of said second plurality of said hexagonal structural network.

3. A cooling tower according to claim 2, wherein one end of each of said beams of said hexagonal network is supported by each of said selected columns of said second plurality at the center of an associated said diffuser, said toroidal base element of said associated diffuser having three inwardly extending projections defining bearing surfaces bearing on said three beams supporting said associated diffuser.

4. A cooling tower according to claim 2, wherein said diffusers comprise a concave toroidal base element having an upper circular edge and a lower lip with a polygonal edge, segments of said polygonal edges of pairs of adjacent diffusers substantially meeting with one another.

5. A cooling tower according to claim 5, wherein continuous in situ concrete joints are formed along the peripheral lips of said base elements of all of said diffusers to define continuity therebetween.

6. A cooling tower according to claim 5, wherein said nonselected columns of said second plurality and said columns of said third plurality are arranged directly beneath openings defined by segments of said polygonal edges of three adjacent said diffusers, a similar polygonal concrete slab closing off the opening between said three adjacent diffusers.

7. A cooling tower according to claim 6, wherein each said slab has a central hole disposed above the associated column, and an in situ concrete joint being formed between said associated column and said concrete slab.

8. A cooling tower according to claim 2, wherein each of said diffusers comprise, stacked on said circular upper edge of a toroidal base element, superposed annular elements, mortar bonding material being applied between adjacent edges of said annular elements and said base element and the immediately superjacent annular element to provide fluid-tightness of said diffusers.

9. A cooling tower according to claim 2, wherein each of said plurality of diffusers is borne by three beams of said hexagonal structural network, and supported by six columns in all, three of the last mentioned columns being the nonselected columns of said second plurality and the three remaining columns alternating with said nonselected columns being part of a third plurality of columns of an equilateral triangular network.

10. A cooling tower according to claim 3, further comprising a plurality of beams and slabs arranged between outermost diffusers and said circumferential beam to provide continuity in the peripheral area of said inner support structure.

11. A cooling tower according to claim 1, wherein apical columns are arranged at the apices of said hexagonal central tower and the hexagonal elements of the hexagonal network being of substantially the same size, the three innermost hexagonal elements of said network each in effect overlapping one-third of said hexagonal central tower.

12. A cooling tower according to claim 1, wherein said central tower comprises six apical columns and a central column coinciding with the axis of the cooling tower, and six beams extending radially from said central column to said apical columns, and a slab floor bearing on said last mentioned beams.

13. A cooling tower according to claim 1, wherein an annular roof is hung between said inner and outer support structures.

* * * * *